July 16, 1929.  G. F. LEE  1,720,843
CONVEYING APPARATUS
Filed May 15, 1926    7 Sheets-Sheet 1

INVENTOR
G. F. Lee
BY
Rogers, Kennedy Campbell
ATTORNEYS.

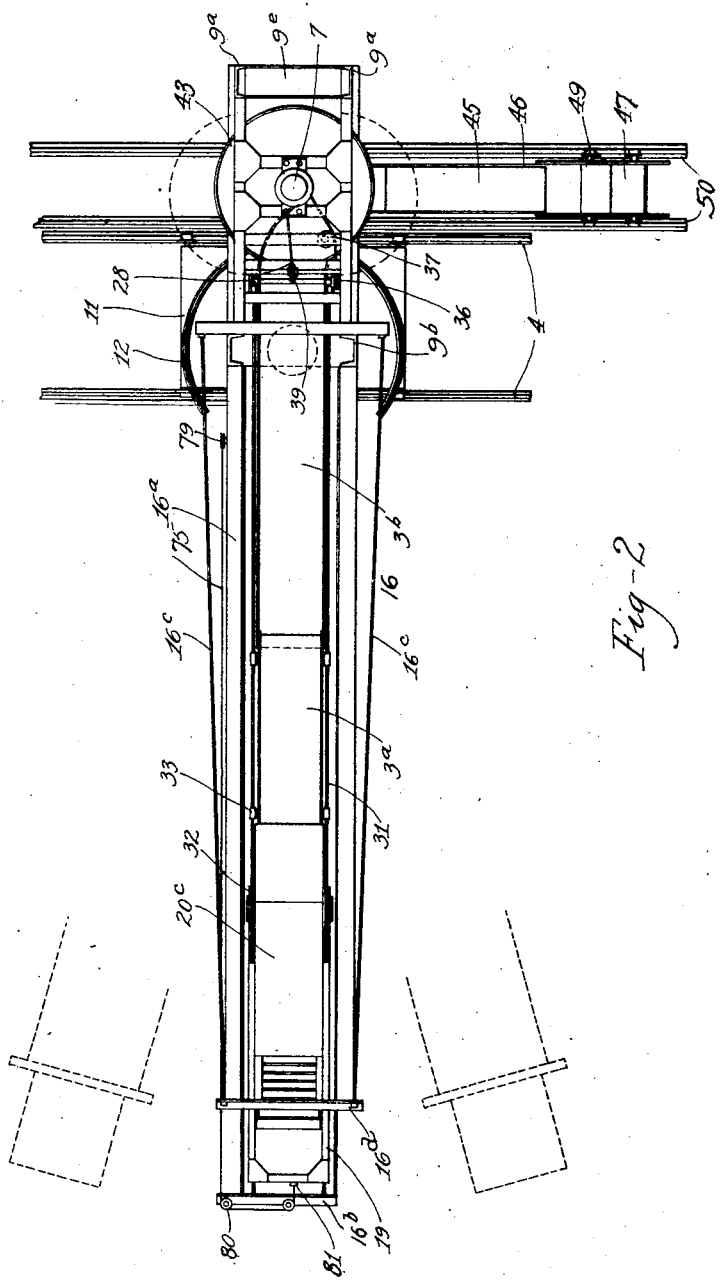

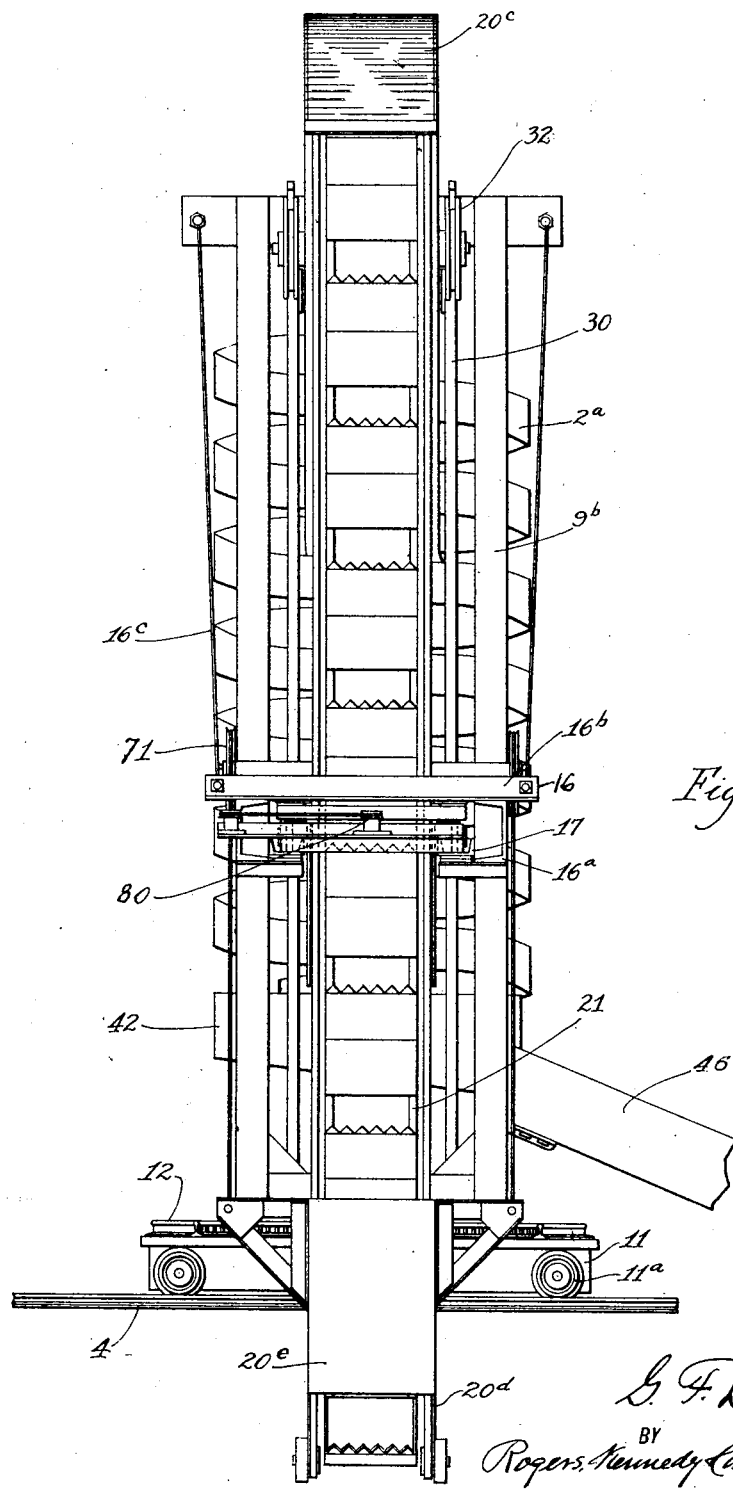

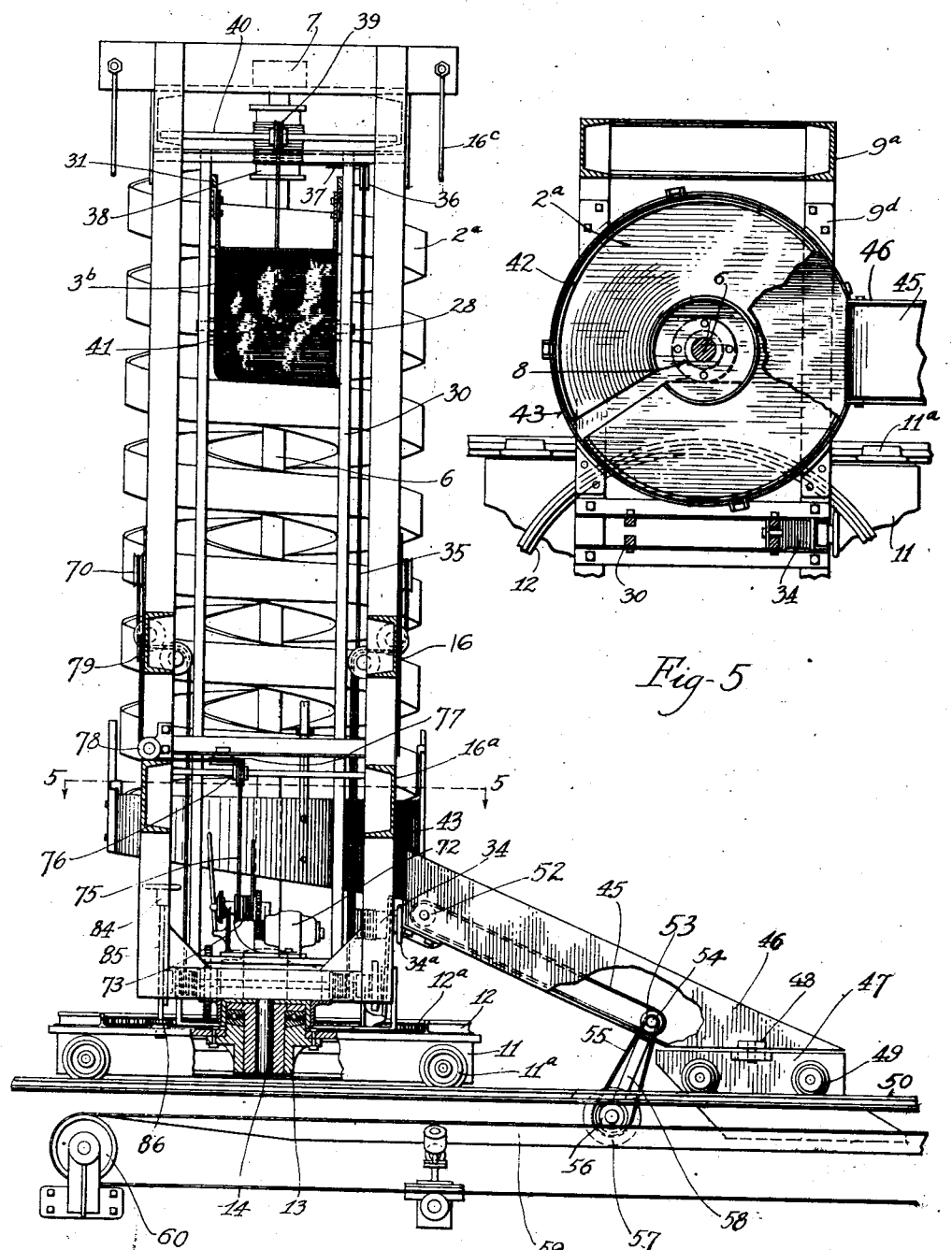

July 16, 1929.   G. F. LEE   1,720,843
CONVEYING APPARATUS
Filed May 15, 1926   7 Sheets-Sheet 6

G. F. Lee INVENTOR
BY Rogers, Kennedy Campbell
ATTORNEYS.

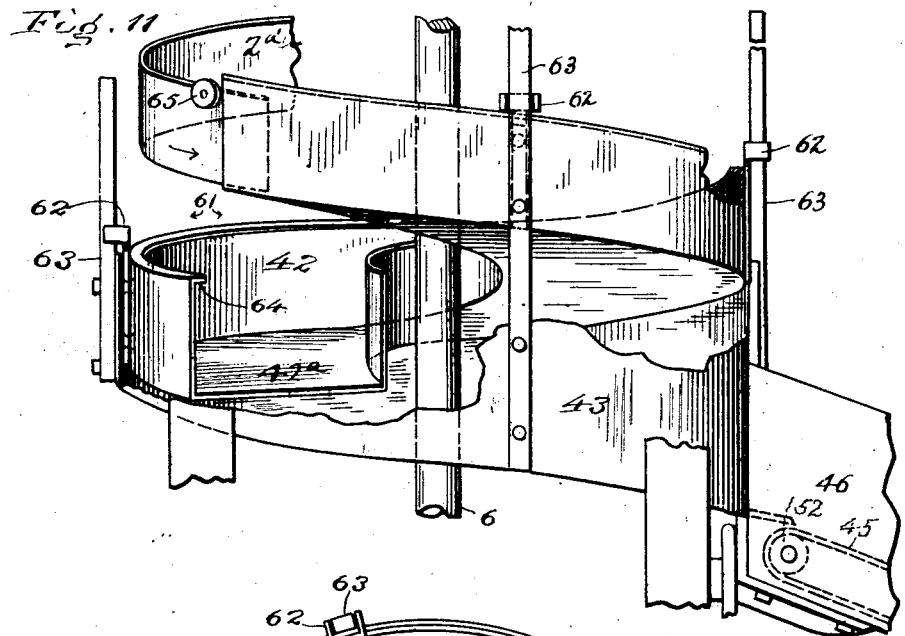
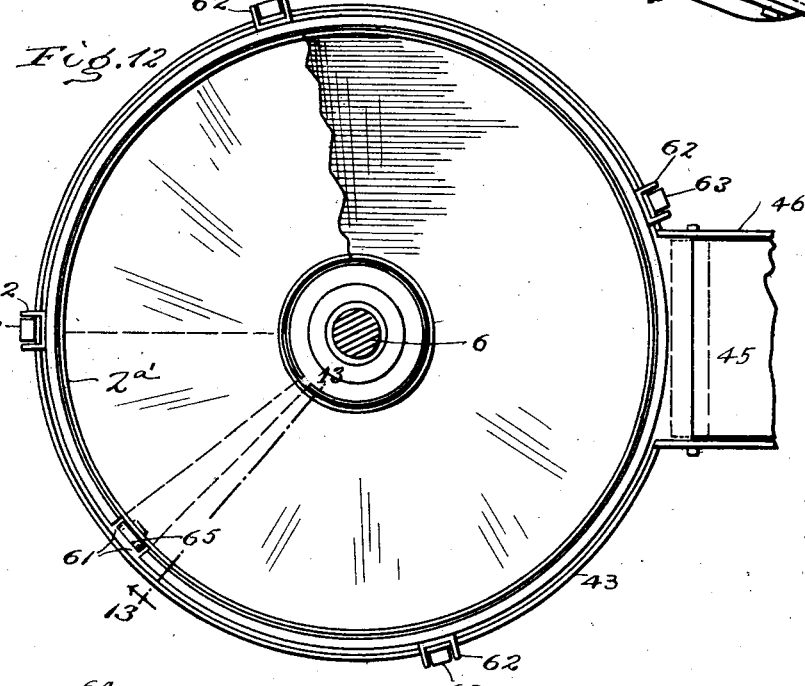
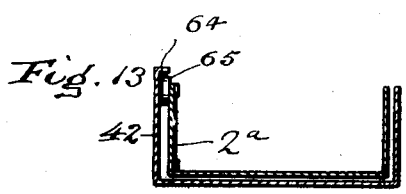

Patented July 16, 1929.

1,720,843

UNITED STATES PATENT OFFICE.

GEORGE F. LEE, OF WILKES-BARRE, PENNSYLVANIA.

CONVEYING APPARATUS.

Application filed May 15, 1926. Serial No. 109,235.

This invention relates to apparatus for conveying material, designed more particularly for unloading ships or vessels and conveying the cargo away for storage or use, although the invention is not limited in its use for this particular purpose. The apparatus of the present invention while capable of use in handling various kinds of material, is of a construction and form which adapts it peculiarly for handling coal, and more particularly for unloading coal from ships or vessels in such manner that the coal will not be allowed in its path of travel to fall through space to such extent as to cause breakage, but will at substantially all times be given positive support.

With this and other objects in view, the invention consists of apparatus of improved form and construction, which will be described in detail in the specification to follow, and the novel parts of which will be set forth in the appended claims.

In the accompanying drawings:

Fig. 2 is a top plan view of the same.

Fig. 3 is a front elevation looking in the direction of the dotted line arrow in Fig. 1.

Fig. 4 is a transverse sectional elevation on an enlarged scale on the line 4—4 of Fig. 1, looking in the direction of the arrows on said line.

Fig. 5 is a longitudinal sectional plan view on the line 5—5 of Fig. 4.

Fig. 11 is a side elevation on an enlarged scale of the discharge end of the convolute chute and the convolute extension and receiving pan.

Fig. 12 is a plan view of the same.

Fig. 13 is a cross section on the line 13—13 of Fig. 12.

Figure 1:
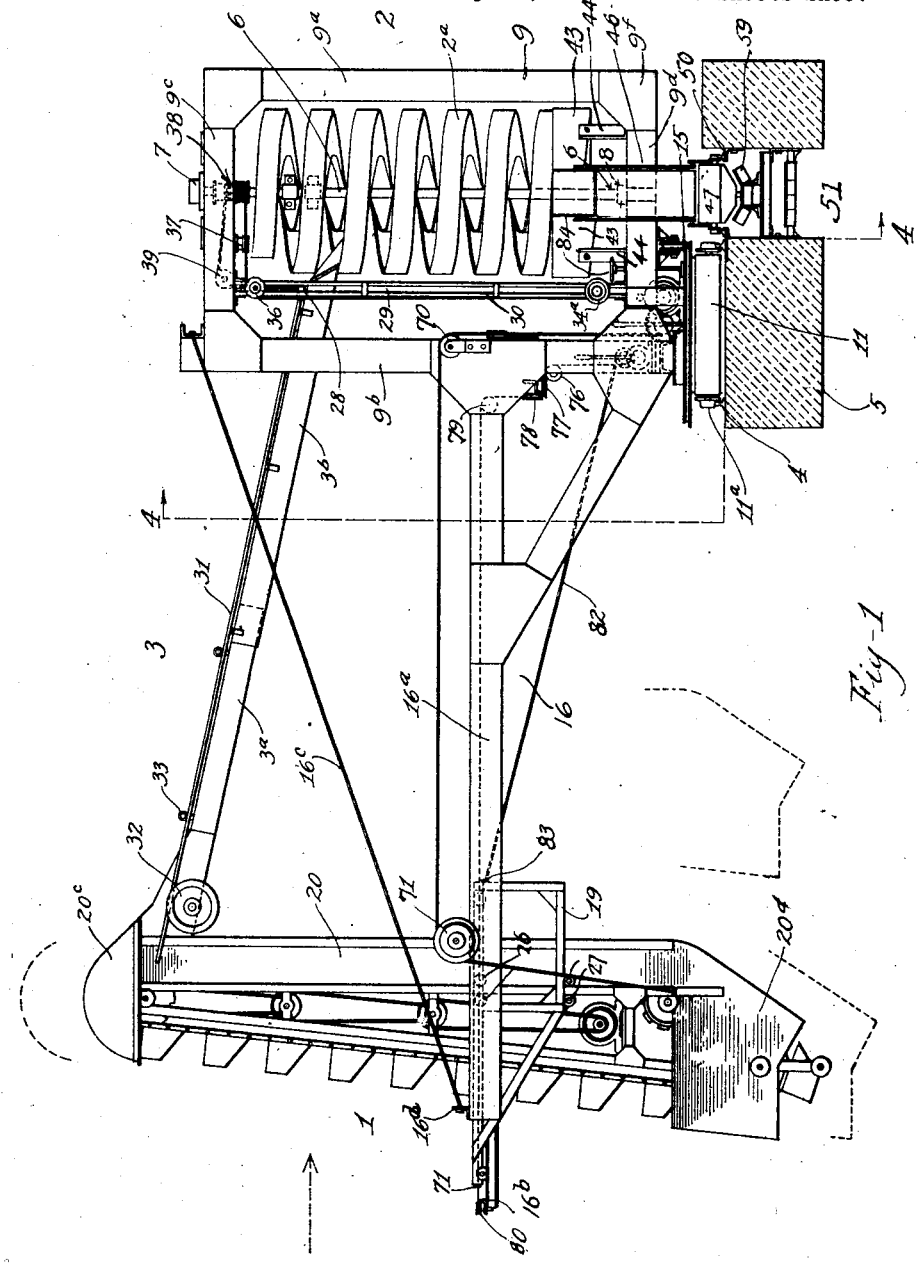
Fig. 1 is a side elevation of the improved apparatus.
Figure 6:
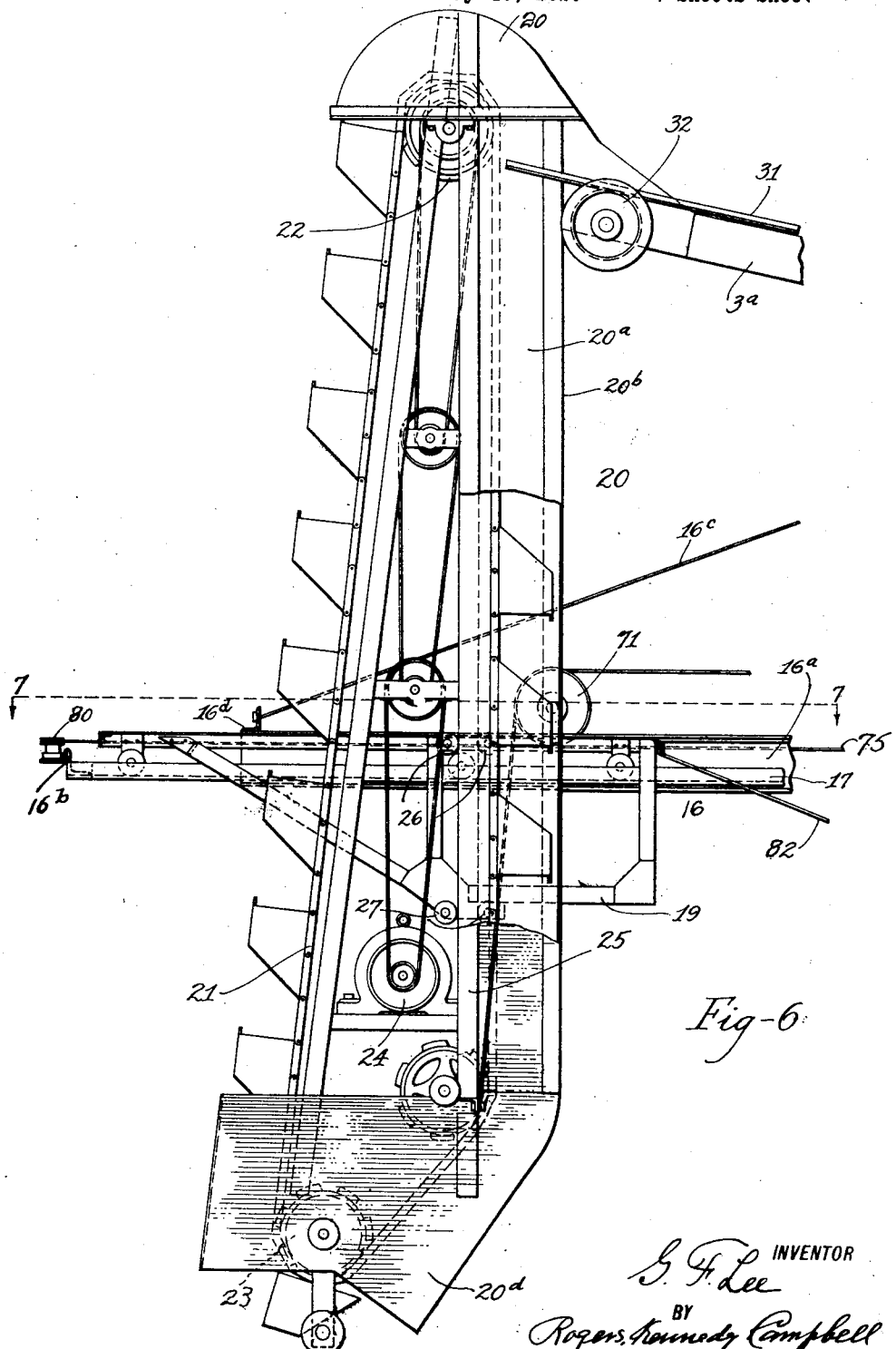
Fig. 6 is a side elevation on an enlarged scale of the elevating device which lifts the material from the vessel's hold or other place of storage.
Figure 7:
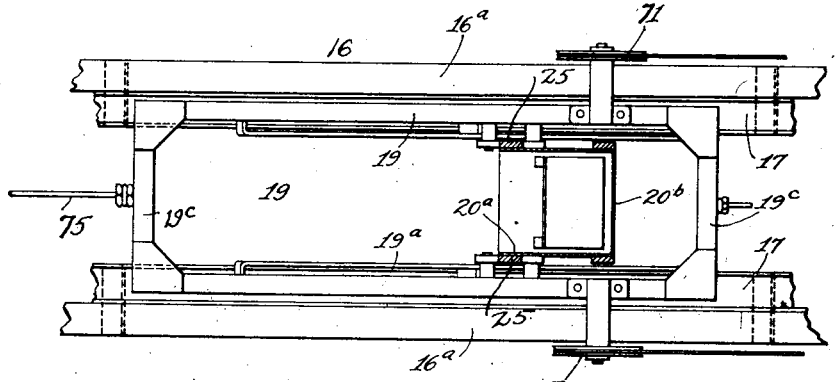
Fig. 7 is a fragmentary horizontal sectional plan view on the line 7—7 of Fig. 6 showing particularly the carriage which supports the elevating device.
Figure 8:
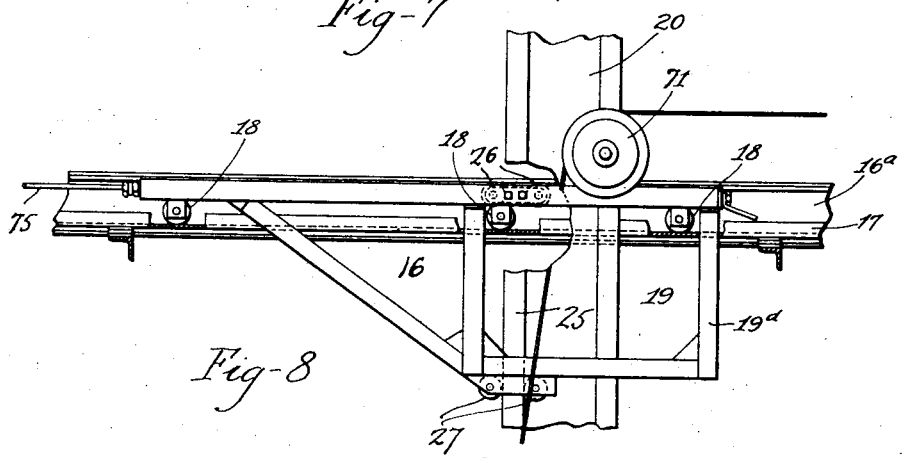
Fig. 8 is a side elevation of the parts shown in Fig. 7.

Referring to the drawings:

As shown more particularly in Fig. 1, the apparatus as a whole comprises an upright elevating device or member 1 adapted to take the material from the unloading point from which it is to be conveyed, for instance the hold of a vessel, an upright fixed chute or member 2 to which the material raised by the elevating device is delivered and down which it flows by gravity, and a transferring trough or member 3 by which the material raised by the elevating device is delivered by gravity to the upright chute. These several elements are, in accordance with my invention, mounted in cooperating relation to each other and constitute a complete portable unit, which can be transported from place to place and used in various localities, according to the character of the material to be handled and the conditions encountered in practice.

In the present illustration of the invention, showing one embodiment by way of example, the apparatus is mounted for travel on a guideway or tracks 4 on a supporting surface or dock 5 with the upright chute 2 supported over the dock, and the elevating device supported to overhang the side of the dock so that it may be lowered into the hold of a vessel lying alongside the dock.

The upright chute 2 is of convolute form and consists of a series of connected convolutions $2^a$ of trough-like form in cross section, and it is sustained on a central vertical rotary shaft 6 mounted at its upper and lower ends in bearings 7 and 8 in a frame 9, receiving support and movable back and forth on the track rails 4 as will be more fully described later on.

The frame 9 comprises in the present instance two vertical rear frame bars $9^a$, two vertical front frame bars $9^b$, upper and lower pairs of side horizontal cross connecting frame bars $9^c$ and $9^d$, and upper and lower pairs of end horizontal connecting bars $9^e$ and $9^f$, the upper bearing 7 for the shaft 6 being supported by the upper cross bars $9^c$, and the lower bearing 8 being supported by the lower frame bars $9^d$.

A truck or car 11 is provided with wheels $11^a$ to travel on the track rails 4, and on this car is fixed a circular track 12 formed on its inner side with rack teeth 12ª. At its center the car is provided with a journal bearing 13 which receives a journal stud 14 depending from the forward lower frame bar 9ᵇ, of the frame 9 which latter is supported from the track 12 by means of a vertical supporting wheel 15 mounted in bearings on the underside of the frame 9. As a result of this construction and arrangement of the parts, the frame 9 is oscillatable on the car 11 about the vertical axis of the journal stud 14, the purpose of which will presently appear.

A horizontal boom 16 extends forwardly from the rear side of the frame 9 and gives support to the conveyor device 1. This boom consists in the present instance of two parallel spaced beams 16ª fixed at their inner ends to the respective vertical frame bars 9ᵇ and connected together at their opposite ends by a horizontal cross bar 16ᵇ, the said beam being supported at its free end by guy rods 16ᶜ connected at their ends respectively to the upper end of the frame 9 and a transverse cleat 16ᵈ fixed to the beams 16ª. On their inner sides the beams 16ª have fixed to them, horizontal tracks or ways 17 on which travel wheels 18 journaled on the opposite sides of a carriage 19. This carriage is formed of an open frame consisting of two longitudinal side frame bars 19ª connected together at their front and rear ends by cross bars 19ᵇ and 19ᶜ, from the opposite sides of which open frame extensions 19ᵈ depend. The carriage is supported on the tracks 17 and is movable back and forth horizontally thereon and gives support to the vertical elevating device 1 which is extended down through the open center of the carriage and is supported thereon in such manner that it can be adjusted vertically to different positions. To bring about this arrangement and operation, the elevating device consists of a supporting frame in the form of an upright casing 20 having side walls 20ª and an end connecting wall 20ᵇ. The casing has fixed to its upper end an overhanging cap portion 20ᶜ and at its lower end it is formed with forward extensions or walls 20ᵈ connected by a cross plate 20ᵉ. An endless chain of elevating buckets or flights 21 is mounted in said casing and travels over a driving sprocket wheel 22 at the upper end of the casing, and over a guide sprocket wheel 23 at the lower end of the same, which chain of buckets is driven by an electric motor 24 supported at the lower portion of the casing and belted to the driving sprocket wheel by the gear reducing system of belts and pulleys shown. The casing 20 is maintained in upright position and guided vertically on the carriage 9 by means of vertical bars or rails 25 fixed to the outer sides of the casing and traveling between upper and lower pairs 26 and 27 of guide wheels journaled on studs extending inwardly from the inner sides of the carriage.

The chain of buckets delivers the elevated material to the receiving end of the trough 3 which extends rearwardly at a downward inclination and has its opposite end positioned to discharge into one or the other of the convolutions of the chute 2, the material, due to the inclination of the trough, flowing by gravity therethrough. The trough is U-shape in cross section as shown in Fig. 4, and is formed in two telescoping sections to make it extensible, a forward inner section 3ª attached to the upper end of the elevator casing in position to receive the material delivered by the buckets, and a rear outer section 3ᵇ formed on its outer sides at its discharge end with lugs or blocks 28 which slide up and down in vertical guideways 29 formed between vertical fixed rails 30 extending between and fixed to the upper and lower frame bars of the frame 9. The section 3ᵇ of the trough has fixed to its sides longitudinal bars 31 which extend forwardly and are movably supported at their front portions on supporting wheels 32 journaled on the outer sides of the forward end of the fixed section 3ª, and this fixed section is movably supported on said bars 31 by means of rollers 33 journaled on the sides of the fixed section at its upper edges and traveling on said bars. By the construction described, the two parts of the transfer trough will slide on each other as the distance between the elevating device and the convolute chute is increased or diminished in the adjustments of the elevating device to and from the chute; and by raising and lowering the discharge end of the trough in the guideways 29, the same inclination of the trough may be preserved in the different vertical adjustments of the elevating device or in the carriage 19.

It will be understood from the foregoing description that by reason of the mounting of the frame 9 carrying the convolute chute, on the car or truck 11, the entire apparatus may be made to traverse the side of the dock and occupy different positions in the length of the same; that by reason of the pivotal mounting of the frame 9 on the car 11, the frame may be oscillated horizontally and the boom swung from side to side as shown by dotted lines in Fig. 2 in order to position the lower end of the elevating device, for instance to different points in the length of the vessel; that by adjusting the elevating device up and down on its carriage, the lower end of the device may be caused to occupy different vertical positions according to the level of the body of material in the hold of the vessel or other place of storage; and that by adjusting the carriage 19 horizontally on the boom, the elevating device may be positioned at different distances from the dock according for instance to the position of the vessel.

In maintaining the same inclination of the trough in the different vertical positions of the elevating device, by reason of the fact that the discharge end of the trough is projected between adjacent convolutions of the chute 2, it is necessary to turn the convolute chute in order to permit the discharge end of the trough to move up and down, and in the present instance this is effected by turning the vertical shaft 6 to which the chute is fixed. This is effected in the present instance by means of a winding drum 34 mounted on the frame 9 at its base and having wound thereon a cable 35 which extends vertically and over guide pulleys 36 and 37 on the upper end of the frame and around a vertical drum 38 on the upper end of the shaft 6. The cable after leaving the opposite end of the drum, passes over a guide pulley 39 on a transverse shaft 40 at the upper end of the frame 9 and is attached at its end to a cross bar 41 fixed to the discharge end of the transfer trough 3. The circumference of the drum 38 is definitely related to the pitch of the convolutions of the chute 2, so that as the drum is rotated, it will act to rotate the chute and wind or unwind the cable end supporting the trough, according to the direction of movement of the drum, and will cause the end of the trough engaged between the convolutions to follow the same and move up or down in consonance with the "feed" of the convolutions. The relative form and arrangement of these parts are such that the end of the trough will be sustained by the cable out of contact with the lower edge of one convolution and the upper edge of the adjacent convolution, and in this way wear or friction between the convolutions and the trough end will be avoided. The adjustment of the trough in this manner is effected by a hand wheel 34$^a$ on the drum 34, and such adjustment is resorted to whenever the receiving end of the trough is changed in its elevation, as when the elevating device is raised or lowered, and in this manner the same inclination of the trough is preserved, notwithstanding the different vertical positions of the elevating device.

The terminal convolution 2$^{a1}$ at the lower end of the chute 2 discharges, through the medium of a convolute extension 42 presently to be described in detail, into an annular receiving pan or receptacle 43 fixed between and supported by upright bracket arms 44 extending upwardly from the lower frame bars of the frame 9 as best shown in Fig. 1. The bottom of the pan extends at a downward inclination from one side to the other, and the material leaving the lowest point of this inclined bottom is received on the upper portion of a downwardly inclined endless conveying belt 45 disposed in the bottom of a downwardly inclined trough 46 fixed at its upper end to the pan or receptacle 43, it being understood that the side of the pan will be formed with a discharge opening to admit of the passage of the material into the trough and onto the belt. The lower end of the trough is in the form of a box or receptacle 47 flexibly connected to the trough as at 48, which receptacle has journaled on its opposite sides carrying wheels 49 traveling on track rails 50 extending parallel to the track rails 4 and along the opposite sides of a channel or passageway 51 in rear of the track rails 4 as best shown in Figs. 1 and 4. Conveying belt 45 passes at its upper end around an upper idler drum 52 journaled in the upper end of the trough 46 and at its lower end around a driving drum 53 journaled in the lower end of the trough, this latter drum having fixed to it a drive pulley 54 for rotating it. A drive belt 55 passes over the pulley 54 and over a pulley 56 on a friction drum 57 mounted in bearings in bracket arms 58 depending from the underside of the trough near its lower end. The said drum 57 is supported in position to be engaged and driven by the upper stretch of an endless horizontal conveying device or belt 59 disposed in the channel 51 passing around suitable guide pulleys 60, only one of which is shown, the belt being driven continuously by a suitable driving means not shown. The material from the pan or receptacle 43 delivered to the belt 45 is discharged by the latter onto the conveying belt 59 and is caried away by this belt for storage or use as the case may be.

The provision of the convolute extension 42 which receives the material from the lower end of the chute and delivers it to the inclined bottom of the pan, is for the purpose of insuring that the material will be directed onto the inclined bottom in the direction of its downward inclination, without regard to the angular adjustment of the terminal convolution 2$^{a1}$, in the adjustments of the chute 2 around its vertical axis. On reference to Fig. 11 it will be seen that this convolute extension is formed as a continuation of the terminal convolution of the chute, and extends a little short of a complete revolution, thereby leaving a space 61 between its ends, the purpose of which will presently appear. The extension is supported within the pan in such manner that while it will be capable of a limited up and down movement, it will be prevented from turning around therein, so that its discharge end 42$^a$ will always be located in the same vertical plane, and will always point in the direction of the downward inclination of the bottom of the pan. To effect this object, there are fixed to the outer wall of the convolute extension, pairs of guiding fingers 62 which extend on opposite sides of vertical guide bars 63 fixed to and extending upwardly from the pan 43. The extension 42 is positioned thus within the pan so that its lower discharge end will rest on the inclined bottom of the pan and will point downwardly. At its upper edge the extension is formed with an inwardly turned flange 64 beneath which is adapted to ride a roller 65 journaled on the upper side edge of the terminal convolution, the form and relation of the parts being such that in the adjustments of the chute about its vertical axis as heretofore described in the direction of the arrow in Fig. 11, the roller will ride beneath the flange and will lift the extension vertically on its guides, and on the roller making a complete revolution and arriving at the space 61, the convolute extension being released, will fall by gravity downwardly to its former position on the bottom of the pan. When the chute is turned in the opposite direction, the roller 65 will ride on the upper side of the flange, and on making a complete revolution, will be allowed, by the inherent resiliency of the extension, to pass over its end and occupy its former position as shown, ready to ride beneath the flange in the next adjustment. It is seen therefore, that while in the adjustments of the convolute chute to maintain the proper inclination of the transfer trough 3, in the different vertical adjustments of the elevating device 1, the material leaving the terminal convolution of the chute, in whatever angular position the latter may be, will always pass onto the inclined bottom of the pan at the same point, and in the direction of its downward inclination.

Figure 9:
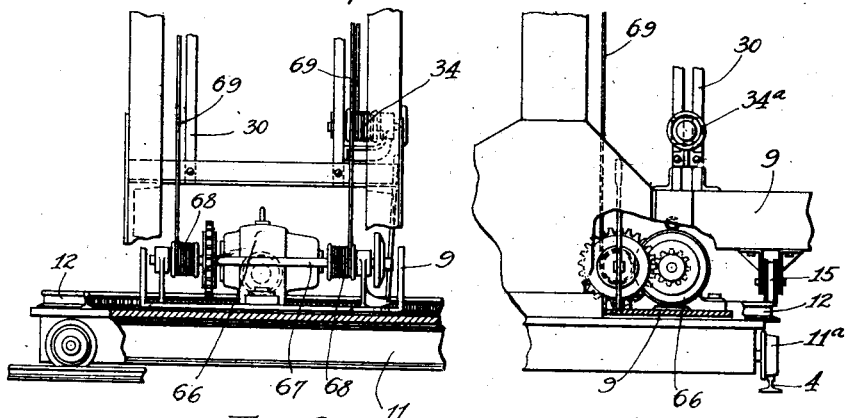
Fig. 9 is a fragmentary sectional elevation showing the motor and winding drum operated thereby for raising and lowering the elevating device on its supporting carriage.
Figure 10:
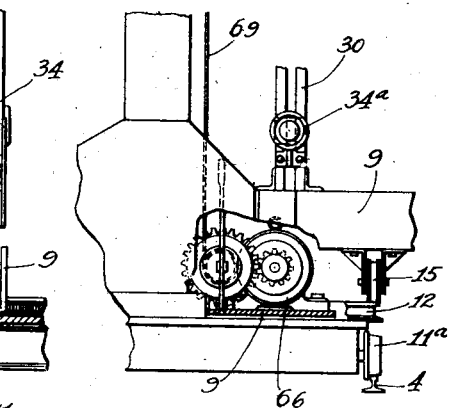
Fig. 10 is an elevation of the same.

The vertical adjustment of the elevating device in its carriage is effected in the present instance by means of a motor 66, see Figs. 1, 9 and 10, which is mounted on the frame 9 and is geared to a shaft 67 mounted on said car. The shaft carries at its opposite ends, winding drums 68 to which are connected cables 69 extending upwardly and over guide pulleys 70 on the sides of the frame 9, whence the cables extend horizontally forwardly and pass over guide pulleys 71 on the sides of the boom 16 and have their ends connected to the side rails 25 of the elevating device casings at the lower ends of said rails. By the operation of the drums 68 to wind up the cables the elevating device will be raised vertically on its carriage, and by releasing the drums, the elevating device will descend by gravity as the cables pay out.

The movement of the carriage 16 back and forth on the boom to adjust the elevating device to and from the convolute chute, is effected by means of a motor 72, Figs. 1 and 4, which is mounted on the frame 9 at its base. This motor is geared to a winding drum 73 journaled in bearings on the frame 9, and a cable 74 is wound thereon. From one end of the drum one lead 75 of the cable passes over guide pulleys 76, 77, 78 and 79 on the frame 9 and thence forward horizontally along the side of the boom 16 and around guide pulleys 80 on the end of the same, and has its end connected with the forward end of the carriage 19 as at 81, Figs. 1 and 2. The other lead 82 of the cable from the opposite end of the drum 73, extends forwardly and is connected to the rear end of the carriage 19 as at 83, so that by operating the winding drum 62 in opposite directions, the carriage 19 may be moved back and forth horizontally to different positions on the boom to adjust the elevating device to and from the convolute chute. In such adjustment of the elevating device, it will be understood that the transfer trough 3 must lengthen and shorten according as the distance between the elevating device and the chute 2 varies, and this action is permitted by the two sections of the trough which slide on each other in their telescoping action.

The oscillation of the frame 9 and parts supported thereby on its vertical axis, constituted by the journal stud 14, is effected by means of a hand wheel 84, see Fig. 5, which is fixed to the upper end of a vertical shaft 85 mounted for rotation on the frame 9, which shaft has fixed to its lower end a pinion 86 engaging the rack teeth $12^a$ on the inner sides of the circular track rails 12, the operation of this hand wheel causing the frame to oscillate on its supporting car, and swinging the elevating device to the right or left as shown by dotted lines in Fig. 2.

In the use of the apparatus, the material is elevated from the point from which it is to be conveyed, by the continously running elevating device, the lower end of which, by the different adjustments hereinbefore described, may be positioned according to the different conditions of deposit or storage and location, etc. of the material. The material raised by the elevating device, is delivered to the transfer trough 3 down which it will flow by gravity and be discharged into that convolution of the chute 2, in operative relation to which the trough is for the time being positioned. The material entering this convolution will flow down the remaining convolutions by gravity, passing in its path successively around the vertical axis of the chute, and leaving the last convolution it will be delivered into the convolute extension 42 and by it to the receiving pan 43, whence it will pass onto the conveying belt 45 leading from said pan, and by it will be delivered to the horizontal conveying belt 59, which will carry it away for storage or use as the case may be. It will be observed that in no part of its travel from the point where it is taken up by the buckets, to the point where it is delivered to the belt 59, does the material fall from one point to another, but is given positive support substantially at every point throughout its travel. This fact is of great importance and advantage in the employment of the apparatus in the handling of such material as coal, since it prevents breakage and reduces the loss or waste in this respect to a minimum.

The apparatus as a whole is compact in the form and arrangement of its parts; is under complete control of the attendant or operator; is capable of adjustments which adapt it to meet the many varying conditions encountered in its field of employment, and to be operated to convey material from point to point in large capacity and with the minimum of waste or loss by breakage.

In the foregoing description and accompanying drawings I have set forth my invention in the particular detailed form which I prefer to adopt, but it will be understood that these details may be variously changed and modified without departing from the scope of the invention; and further it will be understood that the invention is not limited to any particular form or construction of the parts except in so far as such limitations are set forth in the claims.

Having thus described my invention, what I claim is:

1. In a conveying apparatus, the combination of an elevating member, an upright convolute receiving chute, a transfer member extending at an angle between the two for transporting the raised material to the chute, and having its discharge end changeable in position to deliver the material beween any selected adjacent convolutions of the chute, and means for adjusting the elevating member to and from the receiving chute, said transfer member being extensible to permit of said adjustment of the elevating member.

2. In a conveying apparatus, the combination of an elevating member, an upright convolute receiving chute, a transfer trough extending at an angle between the two for transporting the raised material to the receiving chute, and having its discharge end changeable in position to deliver the material between any selected adjacent convolutions of the chute, and means for adjusting the elevating member to and from the receiving chute, said transfer trough being constructed of two telescoping sections to make it extensible to permit of said adjustment of the elevating member.

3. In a conveying apparatus, the combination of an elevating member to raise the material, an upright convolute chute member to receive the raised material, an inclined trough extending between said members and through which the material is adapted to flow by gravity from the elevating member to the chute member, means for adjusting the elevating member vertically relative to the chute member, and means for adjusting the discharge end of the trough vertically relatively to the chute member to preserve the proper inclination of the trough in the different adjustments of the elevating member.

4. In a conveying apparatus, the combination of an elevating member operative to raise the material and adjustable vertically, an upright convolute chute to receive the material from the elevating member, and a transfer member having one end in position to receive the raised material and its other end in position to discharge the material into one or another of the convolutions of the chute member according to the adjustments of the elevating member.

5. In a conveying apparatus, the combination of an upright elevating member operative to raise the material and adjustable vertically, an upright convolute chute to receive the material from the elevating member, and a downwardly inclined transfer trough through which the material is adapted to flow by gravity to the upright chute, said trough having its upper end fixed to the elevating member in position to receive the raised material and having its lower end in position to discharge the material between one or another of adjacent convolutions of the chute member according to the adjustments of the elevating member.

6. In a conveying apparatus, the combination of an elevating member operative to raise the material, an upright convolute chute member to receive the material from the elevating member, an inclined transfer member having one end in position to receive the material from the elevating member and its other end in position to discharge between adjacent convolutions of the chute member, means to adjust the elevating member vertically, means to adjust the discharge end of the transfer member vertically correspondingly, and means to adjust the chute member about a vertical axis to permit of the adjustment of the discharge end of the transfer member.

7. In a conveying apparatus, the combination of an elevating member, an upright convolute chute member, means for adjusting the elevating member vertically and horizontally relative to the chute member, an inclined extensible trough to transfer the material from the elevating member to the chute member, and means to adjust the discharge end of the trough vertically in the vertical adjustments of the elevating member to preserve a uniform inclination of the trough.

8. In a conveying apparatus, the combination of an elevating member to raise the material, an upright convolute chute to receive the material from the elevating member, an inclined transfer trough member having one end in position to receive the material from the elevating member and having its opposite end positioned to discharge the material into one of the convolutions of the chute, means to adjust the elevating member vertically, means to adjust the chute about a vertical axis, and connections between the chute adjusting means and the transfer member to adjust the discharge end of the latter vertically.

9. In a conveying apparatus, the combination of an elevating member to raise the material, means for adjusting the same vertically, an upright convolute chute to receive the raised material and adjustable around its vertical axis, an inclined transfer trough fixed at its upper end to the elevating member to receive the raised material and having its lower end in position to discharge into one of the convolutions of the chute, and adjustable vertically relatively thereto, a winding drum disposed axially of and movable with the chute to adjust the same about its vertical axis, means for rotating the winding drum, and a cable wound on the drum and connected with the trough to adjust its discharge end in consonance with the adjustments of the chute.

10. In a conveying apparatus, the combination of an elevating member to raise the material, means for adjusting the same vertically, an upright convolute chute to receive the raised material and adjustable around its vertical axis, an inclined transfer trough fixed at its upper end to the elevating member to receive the raised material and having its lower end in position to discharge into one of the convolutions of the chute, and adjustable vertically relatively thereto, a winding drum disposed axially of and movable with the chute to adjust the same about its vertical axis, a second winding drum, a cable attached to said second drum and wound on the first drum and extended therefrom and attached to the trough to adjust its discharge end, and means for operating the second drum.

11. In a conveying apparatus, the combination of an upright frame, a boom extending horizontally therefrom, an upright convolute chute mounted in said frame, an upright elevating member sustained by said boom and adjustable thereon vertically, and also horizontally to and from the chute, and an extensible transfer member extending from the elevating member to the chute in position to discharge into one or another of the convolutions of the latter according to the vertical adjustments of the elevating member.

12. In a conveying apparatus, the combination of an upright frame, a boom extending horizontally therefrom, an upright convolute chute mounted in said frame and adapted to receive the material at different selected points in its height, a carriage movable horizontally on said boom, an upright elevating member mounted on the carriage and movable vertically relatively thereto, means for moving the carriage horizontally to different positions on the boom, means for moving the elevating member vertically to different positions on the carriage, and an extensible transfer member extending from the elevating member to the chute to conduct the raised material to different selected points in its height according to the vertical adjustments of the elevating member.

13. In a conveying apparatus, the combination of an upright frame, a boom extending horizontally therefrom, an upright convolute chute mounted in said frame, a carriage movable horizontally on said boom, an upright elevating member mounted on the carriage and movable vertically relatively thereto, means for moving the carriage horizontally to different positions on the boom, means for moving the elevating member vertically to different positions on the carriage, an extensible transfer trough extending at a downward inclination from the elevating member to the chute with its lower end in position to discharge into one of the convolutions of the chute, and means to adjust the lower end of the transfer trough vertically to preserve a uniform inclination of the same in the different vertical adjustments of the elevating member.

14. In a conveying apparatus, the combination of an upright frame, an upright convolute chute mounted therein, and adapted to receive between adjacent convolutions the material to be conveyed, said convolute chute being adjustable around its vertical axis, and a fixed receptacle at the base of the frame in position to receive the material from the last convolution, said receptacle being provided with a bottom inclined downwardly circumferentially thereof.

15. In a conveying apparatus, the combination of a supporting car adapted to travel on a guide-way, an upright frame supported on said car, an upright convolute chute mounted in said frame, means for delivering the material to be conveyed between adjacent convolutions of the chute, a horizontal conveying device extending parallel to and alongside the guide-way on which the car travels, and means for directing the material discharged from the convolute chute to said horizontal conveying device, said means being movable with the supporting car.

16. In a conveying apparatus, the combination of a supporting car adapted to travel on a guide-way, an upright frame supported on said car, an upright convolute chute mounted in said frame, an elevating member sustained by the frame and operative to raise the material, a transfer member to deliver the raised material to the chute, a horizontal conveying device extending parallel to and alongside the guide-way on which the car travels, and means for directing the material discharged from the convolute chute to the said horizontal conveying device, said means being movable with the supporting car.

17. In a conveying apparatus, the combination of an upright convolute chute member, a horizontal traveling conveying device in position to receive the material from the chute, a conveyor belt between the chute and conveying device to carry the material to the latter, and means whereby the said conveyor belt is driven by the traveling conveying device.

18. In a conveying apparatus, the combination of an upright frame adapted to travel on a guide-way, an upright convolute chute sustained by said frame, means for delivering the material to be conveyed to said chute, a horizontal conveying device extending parallel to the path of travel of the frame, a supporting track extending parallel to the travel of the conveying device, and a downwardly inclined trough movable with the frame and in position to direct the material from the chute to the horizontal conveying device, the lower end of said trough being supported by and movable on said track.

19. In a conveying apparatus, the combination of a supporting car movable on a guide-way, an upright frame supported on said car and adjustable thereon about a vertical axis, an upright convolute chute mounted in the supporting frame and down which member the material is adapted to flow by gravity, a supporting boom extending horizontally forwardly from said upright frame, a carriage adjustable horizontally on said boom, an elevating member supported by and adjustable vertically on the carriage, a downwardly inclined trough having its upper end fixed to the upper end of the elevating member and its lower end in position to discharge the material flowing therethrough by gravity, between adjacent convolutions of the chute, the said trough being extensible to permit of the horizontal adjustments of the elevating member on the boom, and the discharge end of the trough being adjustable vertically to preserve a uniform inclination of the same in the vertical adjustments of the elevating member, and means for adjusting the convolute chute about a vertical axis to permit of the adjustments of the trough.

20. In a conveying apparatus, the combination of an upright frame, an upright convolute chute mounted therein and adapted to receive the material to be conveyed, said chute being adjustable around a vertical axis, a fixed receptacle provided with an inclined bottom, a convolute extension at the discharge end of the chute, in position to receive the material from the chute and direct it onto the bottom of said receptacle, said extension being movable vertically in the adjustments of the chute, and means for restraining said extension against circumferential movement.

21. In a conveying apparatus, the combination of an upright frame, an upright convolute chute mounted therein and adapted to receive the material to be conveyed, said chute being adjustable around a vertical axis, a fixed receptacle provided with an inclined bottom, and a convolute extension at the discharge end of the chute in position to receive the material from the chute and direct it onto the bottom of said receptacle, said extension being restrained against circumferential movement in the adjustments of the chute.

22. In a conveying apparatus, the combination of an elevating mechanism adjustable vertically according to the storage level of the material to be elevated, an upright convolute receiving chute, a transfer member in position to receive the material from the elevating member and serving to convey the same by gravity to the chute, and means for positioning the discharge end of the transfer member to deliver the material between any selected adjacent convolutions of the chute according to the adjustments of the elevating member.

23. A portable conveying unit comprising in combination a suitable supporting frame, an elevating mechanism sustained by said frame and adjustable vertically according to the storage level of the material to be elevated, an upright convolute receiving chute mounted on said frame, a transfer member in position to receive the material from the elevating member and serving to convey the same by gravity to the receiving chute, and means for positioning the discharge end of said transfer member to deliver the material between any selected adjacent convolutions of the chute according to the vertical adjustments of the elevating member.

24. A portable conveying unit comprising in combination, a suitable supporting frame, an elevating mechanism sustained by said frame and adjustable vertically thereon according to the storage level of the material to be elevated and adjustable also horizontally relatively to the frame about an upright axis, an upright convolute receiving chute mounted on said frame, a transfer member in position to receive the material from the elevating member and serving to convey the same by gravity to the receiving chute, and means for positioning the discharge end of said transfer member between any selected adjacent convolutions of the chute according to the vertical adjustments of the elevating member.

25. A portable conveying unit comprising in combination a suitable supporting frame, an elevating mechanism sustained by said frame and adjustable vertically according to the storage level of the material to be elevated and adjustable also horizontally to and from the frame and also about an upright axis, an upright convolute receiving chute mounted on the frame, a transfer member in position to receive the material from the elevating member and serving to convey the same by gravity to the receiving chute, and means for positioning the discharge end of said transfer member to deliver the material between any selected adjacent convolutions of the chute according to the vertical adjustments of the elevating member.

26. A portable conveying unit comprising in combination, a suitable frame adapted to be moved from place to place at will, an upright convolute chute mounted on said frame and adapted to receive the material at a given point in its height and serving to convey the same by gravity downwardly, a supporting boom fixed to and extending laterally from said frame, an upright endless chain of elevating buckets mounted on and adjustable vertically relatively to the boom, and a transfer trough fixed at one end in position to receive the material elevated by the chain of buckets and having its other end in position to deliver the material between adjacent convolutions of the convolute chute, said trough extending at a slight downward inclination to the convolute chute so as to cause the material to flow by gravity without breakage; whereby the material is supported throughout its path of travel and is delivered without danger of breakage.

27. A portable conveying unit comprising in combination, a supporting car movable on a guide-way, an upright frame mounted on said car and turnable thereon about a vertical axis, an upright convolute chute mounted on said frame and adapted to receive the material at a given point in its height and serving to direct the same by gravity downwardly, a supporting boom fixed to and extending laterally from said frame, an upright endless chain of elevating buckets mounted on and adjustable vertically relatively to the boom, and a transfer trough fixed at one end in position to receive the material elevated by the chain of buckets and having its other end in position to deliver the material between adjacent convolutions of the convolute chute, said trough extending at a slight downward inclination to the convolute chute so as to cause the material to flow by gravity without breakage.

28. A portable conveying unit comprising in combination, a supporting car movable on a guide-way, an upright frame mounted on said car and turnable thereon about a vertical axis, an upright convolute chute mounted on said frame and adapted to receive at a selected point in its height the material to be conveyed and to deliver the same by gravity downwardly, a supporting boom fixed to and extending laterally from the frame, an elevating mechanism carried by the boom and adjustable vertically relatively thereto, and a transfer trough extending between the elevating mechanism and chute and adapted to receive the material from the elevating mechanism and deliver the same by gravity to the chute.

In testimony whereof, I have affixed my signature hereto.

GEORGE F. LEE.